(12) United States Patent
Washizu et al.

(10) Patent No.: US 8,581,467 B2
(45) Date of Patent: Nov. 12, 2013

(54) STATOR INCLUDING A CAGE COIL

(75) Inventors: Shinichi Washizu, Aichi-gun (JP);
Hisanori Nakamura, Toyota (JP);
Shinji Kato, Nisshin (JP); Tomoyuki Otake, Okazaki (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 249 days.

(21) Appl. No.: 13/129,055

(22) PCT Filed: Sep. 28, 2009

(86) PCT No.: PCT/JP2009/067298
§ 371 (c)(1),
(2), (4) Date: May 12, 2011

(87) PCT Pub. No.: WO2010/055738
PCT Pub. Date: May 20, 2010

(65) Prior Publication Data
US 2011/0227445 A1    Sep. 22, 2011

(30) Foreign Application Priority Data
Nov. 13, 2008  (JP) .................. 2008-291422

(51) Int. Cl.
*H02K 3/28* (2006.01)
*H02K 3/04* (2006.01)
*H02K 3/12* (2006.01)

(52) U.S. Cl.
USPC ............. 310/208; 310/71; 310/184; 310/198

(58) Field of Classification Search
USPC ........... 310/208, 207, 198, 203–206, 71, 179, 310/180, 184–188

IPC ....................... H02K 3/28, 3/04, 3/12
See application file for complete search history.

(56) References Cited

U.S. PATENT DOCUMENTS

| 6,930,426 B2* | 8/2005 | Neet et al. ............ 310/208 |
| 2002/0053853 A1* | 5/2002 | Nishimura ........... 310/208 |

(Continued)

FOREIGN PATENT DOCUMENTS

| JP | 2000-069700 A | 3/2000 |
| JP | 2001-145286 A | 5/2001 |

(Continued)

OTHER PUBLICATIONS

Machine translation of JP2008-253063 (published Oct. 2008, translated Nov. 2012).*

(Continued)

*Primary Examiner* — Burton Mullins
*Assistant Examiner* — Michael Andrews
(74) *Attorney, Agent, or Firm* — Kenyon & Kenyon LLP

(57) ABSTRACT

A stator comprises: a stator core having a plurality of slots; and a cage coil formed of a rectangular combined conductor that is wound by a plurality of turns. The combined conductor includes: a first conductor formed in a continuous zig-zag pattern; a second conductor formed in a continuous zig-zag pattern, the first and second conductors being combined to overlap one on the other with a displacement of one pitch; conductor in-slot portions overlapped and mounted in each of the slots of the stator core; conductor connecting portions placed circumferentially on the outside of the slots; and conductor stepped portions connecting the conductor in-slot portions and the conductor connecting portions.

10 Claims, 18 Drawing Sheets

(56) References Cited

U.S. PATENT DOCUMENTS

2002/0063490 A1    5/2002    Asao et al.
2003/0034703 A1*   2/2003    Oohashi et al. ............. 310/68 B

FOREIGN PATENT DOCUMENTS

| | | |
|---|---|---|
| JP | 2002-153001 A | 5/2002 |
| JP | 2002-165396 A | 6/2002 |
| JP | 2008-108522 A | 5/2008 |
| JP | 2008-113539 A | 5/2008 |
| JP | 2008-125298 A | 5/2008 |
| JP | 2008125298 A * | 5/2008 ............... H02K 3/04 |
| JP | 2008-253063 A | 10/2008 |
| JP | 2008253063 A * | 10/2008 ............... H02K 3/28 |

OTHER PUBLICATIONS

Machine translation of JP2008-125298 (published May 2008, translated Nov. 2012).*

International Search Report and Written Opinion dated Mar. 23, 2010.

* cited by examiner

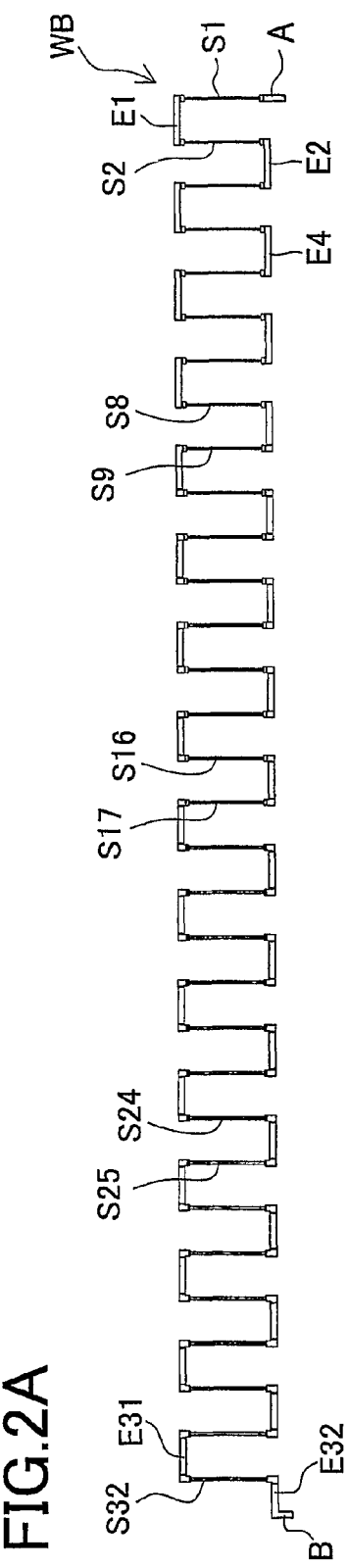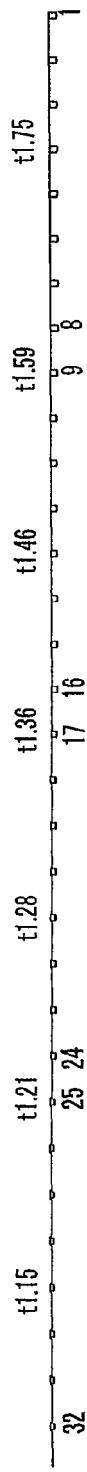

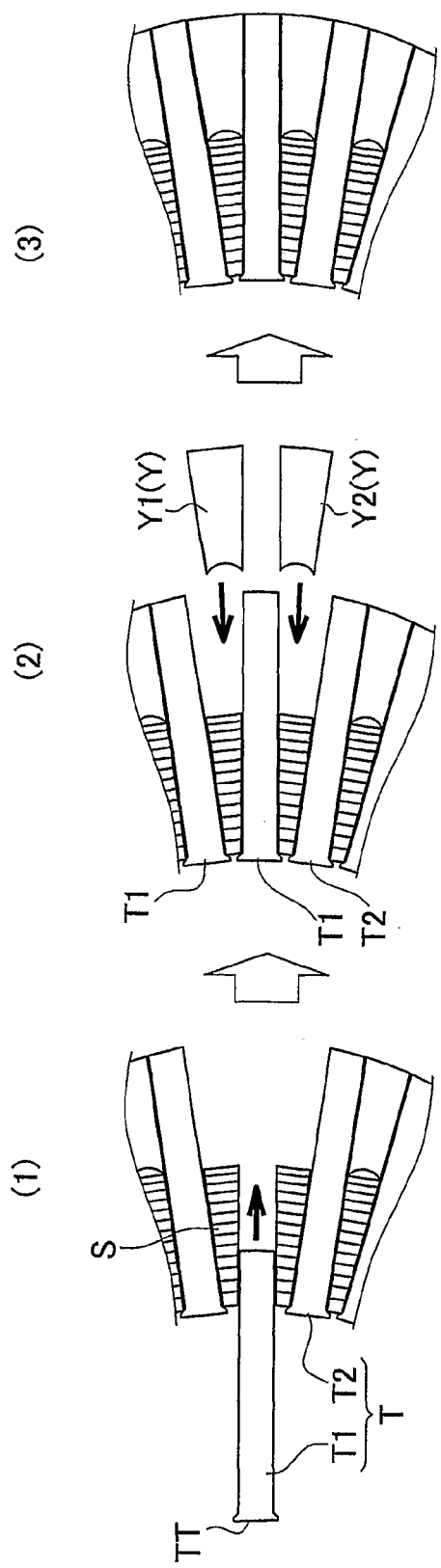

STATOR INCLUDING A CAGE COIL

This is a 371 national phase application of PCT/JP2009/067298 filed 28 Sep. 2009, which claims priority to Japanese Patent Application No. 2008-291422 filed 13 Nov. 2008, the contents of which are incorporated herein by reference.

TECHNICAL FIELD

The present invention relates to a stator for use in a motor or the like and more particularly to a stator including a wave winding coil made of a conductor wound in a wave form, and a coil.

BACKGROUND ART

Patent Literature 1 discloses a technique of combining a plurality of wave winding coils each made of a conductor wound in a wave form so that the coils are displaced or offset from each other by one slot pitch.

If a stepped portion 223 shown in FIG. 3 of Patent Literature 1 is formed in one end of each conductor but which is not obviously described in the specification and drawings, the other end has to be formed with a reversed stepped portion conforming to the stepped portion 223. Otherwise, the coils are displaced in sequence and thus coil end portions could not be formed in circular shape.

If the reversed stepped portion is formed in the other end, two wave winding coils could not be combined in simple overlapping relation, which is not clearly described in Patent Literature 1. The two coils always need to be sequentially braided as disclosed in Patent Literature 1.

CITATION LIST

Patent Literature

Patent Literature 1: JP2000-069700 A
Patent Literature 2: JP2002-153001 A
Patent Literature 3: JP2008-113539 A

SUMMARY OF INVENTION

Technical Problem

However, the technique disclosed in Patent Literature 1 has the following problems.

(1) Even though it is not described in Patent Literature 1, the present applicants actually found from an experiment that the wave winding coils had to be not only placed simply in overlapping relation but also braided in sequence. This decreased production efficiency.

(2) A cross sectional shape of the coil end of each conductor is equal to that of an in-slot portion of each conductor (particularly, the thickness of an in-slot portion and the thickness of the coil end portion are equal in a diametrical direction). Accordingly, if the cross sectional area of the conductor is increased, the length of the coil end portion in the diametrical direction is longer, leading to an increased size of the entire motor, which runs counter to the demand for size reduction of the motor.

The present invention has been made to solve the above problems and has an object to provide a stator and a coil with a compact coil end with high production efficiency.

Solution to Problem (1) To achieve the above object, the invention provides a stator comprising: a stator core having a plurality of slots; and a cage coil formed of a rectangular combined conductor that is wound by a plurality of turns, the combined conductor including: a first conductor formed in a continuous zig-zag pattern; a second conductor formed in a continuous zig-zag pattern, the first and second conductors being combined to overlap one on the other with a displacement of one pitch; conductor in-slot portions overlapped and mounted in each of the slots of the stator core; conductor connecting portions placed circumferentially on the outside of the slots; and conductor stepped portions connecting the conductor in-slot portions and the conductor connecting portions, wherein the first conductor and the second conductor are separately provided, and the cage coil includes a first-phase cage coil, a second-phase cage coil, and a third-phase cage coil that are wound on one another for applying W-phase current, V-phase current, and U-phase current respectively.

(2) In the stator set forth in (1), preferably, each conductor connecting portion has a thin plate shape.

Herein, a method of forming the connecting portion into a thin plate may include deformation machining such as pressing and forging, machining such as casting, etc.

(3) In the stator set forth in (1) or (2), preferably, the stepped portions have different lengths according to the positions of the conductor in-slot portions. Herein, when the thicknesses of the conductor in-slot portions are made different as described in (4), the lengths of the stepped portions may be determined to be different according to the positions of the conductor in-slot portions and the thicknesses of the conductor in-slot portions.

(4) In the stator set forth in one of (1) to (3), preferably, the conductor in-slot portions have different thicknesses and widths so that the thicknesses are smaller and the widths are wider in sequence from an inner peripheral side toward an outer peripheral side of the stator core when the conductor in-slot portions are mounted in the slots.

(5) In the stator set forth in one of (1) to (4), preferably, the first-phase cage coil includes a protrusion in each of the connecting portions arranged in both ends in an axial direction of the stator, the second-phase cage coil includes a recess in each of the conductor connecting portions to bypass the protrusion formed in each of the connecting portions of the first-phase cage coil, and the connecting portions of the second-phase cage coil are placed in close contact with the connecting portions of the first-phase cage coil in a diametrical direction of the stator, excepting the recesses.

(6) According to another aspect of the invention, there is provided, a coil to be mounted in a stator core having a plurality of slots, the coil comprising: a cage coil formed of a rectangular combined conductor that is wound by a plurality of turns, the combined conductor including: a first conductor formed in a continuous zig-zag pattern; a second conductor formed in a continuous zig-zag pattern, the first and second conductors being combined to overlap one on the other with a displacement of one pitch, conductor in-slot portions to be overlapped and mounted in each of the slots of the stator core; conductor connecting portions to be placed circumferentially on the outside of the slots; and conductor stepped portions connecting the conductor in-slot portions and the conductor connecting portions, wherein the first conductor and the second conductor are separately provided, and the cage coil includes a first-phase cage coil, a second-phase cage coil, and a third-phase cage coil that are wound on one another for applying W-phase current, V-phase current, and U-phase current respectively.

(7) In the coil set forth in (6), preferably, each conductor connecting portion has a thin plate shape.

(8) In the coil set forth in (6) or (7), preferably, the stepped portions have different lengths according to the positions of the conductor in-slot portions. Herein, if the thicknesses of the conductor in-slot portions are made different as described in (9), the lengths of the stepped portions may be determined to be different according to the positions of the conductor in-slot portions and the thicknesses of the conductor in-slot portions.

(9) In the coil set forth in one of (6) to (8), preferably, the conductor in-slot portions have different thicknesses and widths so that the thicknesses are smaller and the widths are wider in sequence from an inner peripheral side toward an outer peripheral side of the stator core when the conductor in-slot portions are mounted in the slots.

(10) In the coil set forth in one of (6) to (9), preferably, the first-phase cage coil includes a protrusion in each of the connecting portions arranged in both ends in an axial direction, the second-phase cage coil includes a recess in each of the conductor connecting portions to bypass the protrusion formed in each of the connecting portions of the first-phase cage coil, and the connecting portions of the second-phase cage coil are placed in close contact with the connecting portions of the first-phase cage coil in a diametrical direction of the stator, excepting the recesses.

Advantageous Effects of Invention

According to the stator and the coil having the above configurations described in (1) and (6), the first conductor and the second conductor have only to be simply placed in overlapping relation with a displacement from each other by one pitch without braiding, thereby enhancing the production efficiency.

Herein, if the conductors are simply overlapped one on the other, each of the connecting portions may have increased thickness in the diametrical direction. However, in the above configuration (2) and (7), the connecting portions are formed in thin plate shape by pressing and therefore overlapping of such thin-plate-shaped connecting portions can reduce the thickness thereof in the diametrical direction. This can reduce the length of the coil end in the diametrical direction and achieve an entirely compact motor.

Furthermore, the connecting portions each having a thin plate shape may cause displacement or deviation between the connecting portion and the conductor in-slot portion. In the above configuration, however, the conductor stepped portions having different lengths can place the connecting portions in any positions even if the displacement occurs.

Furthermore, according to the aforementioned stator and coil described in (3), (4), (8), and (9), if the positions of the conductor in-slot portions are different from the positions of the connecting portions, such difference can be adjusted by the stepped portions having different lengths. Accordingly, it is possible to freely design the positions of the conductor in-slot portions and the positions of the connecting portions.

Moreover, according to the stator and the coil described in (5) and (10), the thin-plate-shaped connecting portion includes the recess and therefore the recess allows bypassing of a joining portion between the conductor in-slot portion and the connecting portion even if it becomes wider. This makes it possible to reduce the entire length of the connecting portions in the diametrical direction, resulting in a reduced length of the coil end in the diametrical direction, thus achieving an entirely compact motor.

BRIEF DESCRIPTION OF DRAWINGS

FIG. 2A is a front view of a second conductor;
FIG. 2B is a bottom view of the second conductor;
FIG. 18 is a view to explain a method of manufacturing a stator core.

DESCRIPTION OF EMBODIMENTS

A detailed description of a preferred embodiment of a stator and a coil embodying the present invention will now be given referring to the accompanying drawings.

Figure 1A:
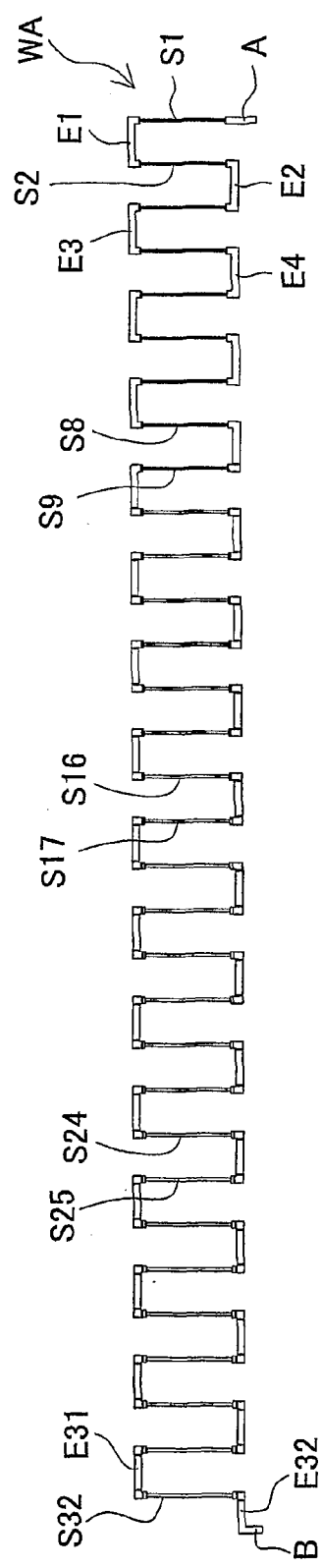
FIG. 1A is a front view of a first conductor.
Figure 1B:
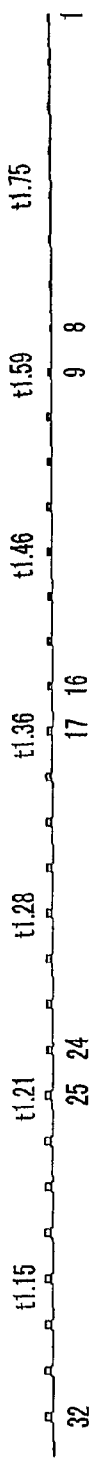
FIG. 1B is a bottom view of the first conductor.

FIG. 1A is a front view of a first conductor WA formed in a continuous rectangular wave pattern (a zig-zag pattern) and FIG. 1B is a bottom view of the same.

The first conductor WA is formed in a continuous zig-zag pattern, including a terminal portion A at a front end, an conductor in-slot portion (hereinafter, also referred to as an "in-slot portion") S1 connected to the terminal portion A and to be mounted in a slot, a conductor connecting portion (hereinafter, also referred to as a "connecting portion") E1 to be circumferentially arranged outside the slot, an in-slot portion S2, a connecting portion E2, ... an in-slot portion S32, a connecting portion E32, and a terminal portion B.

FIG. 2A is a front view of a second conductor WB formed in a continuous rectangular wave form and FIG. 2B is a plan view of the same seen from bottom.

The second conductor WB is formed in a continuous zig-zag pattern, including a terminal portion A at a front end, an in-slot portion S1 connected to the terminal portion A and to be mounted in a slot, a connecting portion E1 to be circumferentially arranged outside the slot, an in-slot portion S2, a connecting portion E2, ... an in-slot portion S32, and a connecting portion E32 and a terminal portion B.

In each of the first conductor WA and the second conductor WB, the connecting portions E1, E3, ... E31 and the other connecting portions E2, E4, ... E32 are alternately provided on different sides of the in-slot portions S (S1 to S32).

The entire length of the second conductor WB is determined to be longer than the entire length of the first conductor WA, the details of which will be explained later. This is because the second conductor WB is wound around the first conductor WA.

Figure 4:
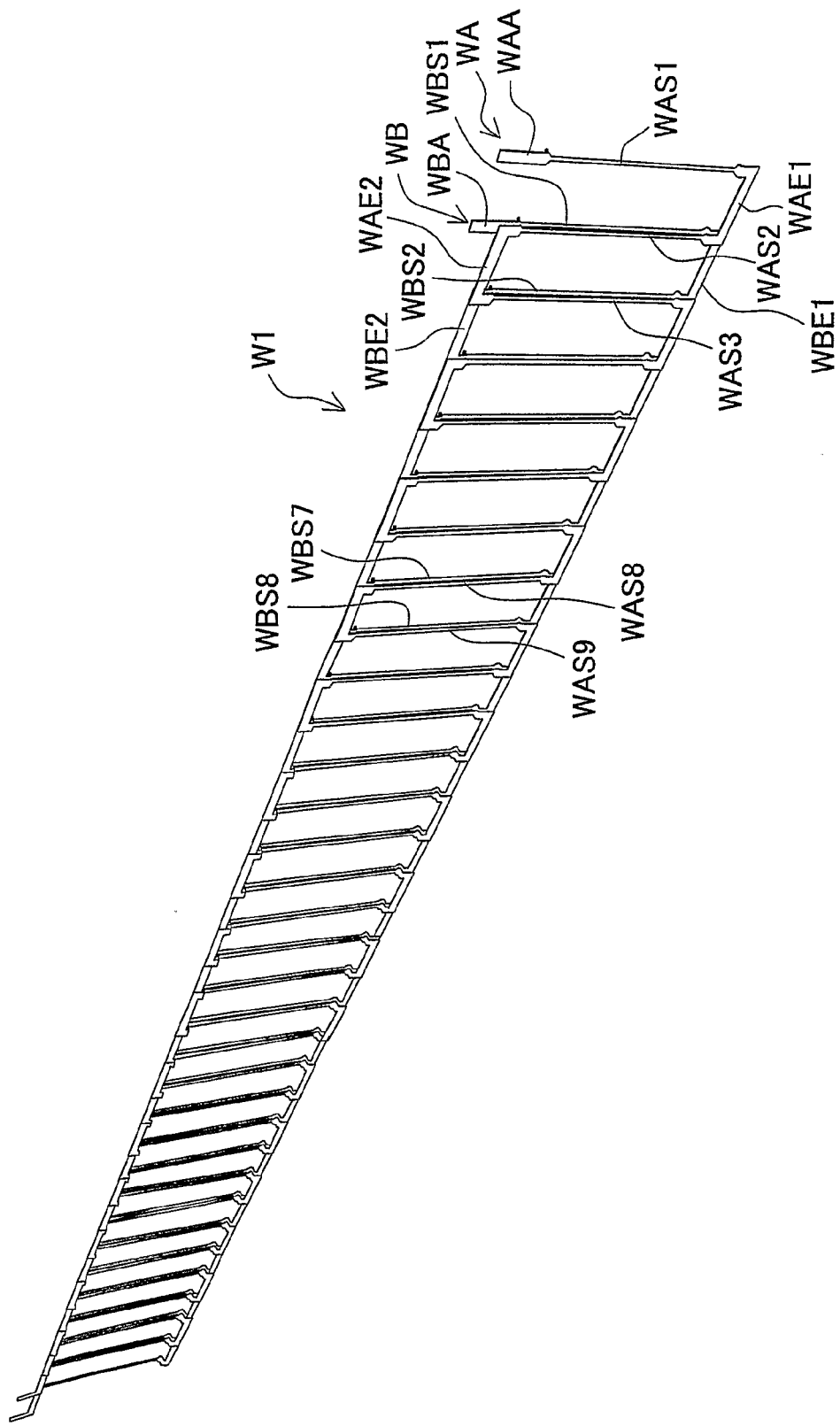
FIG. 4 is a perspective view of a rectangular combined conductor.
Figure 5:
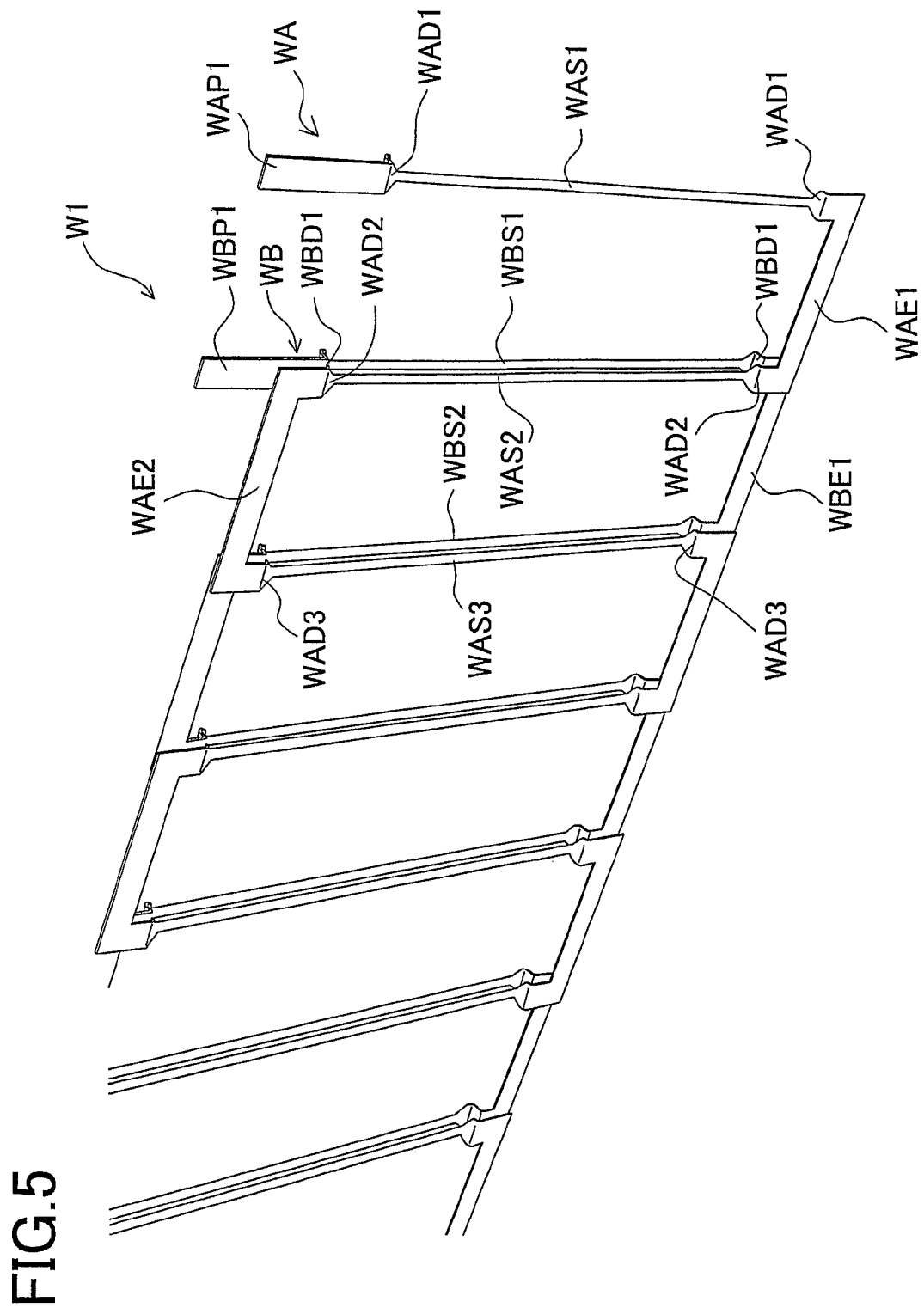
FIG. 5 is an enlarged partial perspective view of a right end part of the combined conductor in FIG. 4.

The first and second conductors WA and WB are combined to be displaced or offset from each other by one pitch, forming a combined conductor W1 having rectangular sections. FIG. 4 is a perspective view of this combined conductor W1. FIG. 5 is an enlarged partial view of a right end part of the combined conductor W1 in FIG. 4. Combining the first and second conductors WA and WB to be offset from each other by one pitch is to form the combined conductor W1 having rectangular sections without overlapping connecting portions WAE (WAE1, WAE2, ...) of the first conductor WA and connecting portions WBE (WBE1, WBE2, ...) of the second conductor WB one on the other.

The first in-slot portion S1 of the first conductor WA (hereinafter, referred to as "in-slot portion WAS1") is singularly present. A first in-slot portion WBS1 of the second conductor WB is overlapped on the outer side (the back side) of a second in-slot portion WAS2 of the first conductor WA.

As shown in FIG. 5, a stepped portion WAD2 that connects the in-slot portion WAS2 and a connecting portion WAE1 and a stepped portion WBD1 that connects the in-slot portion WBS1 and a connecting portion WBE1 are formed with the same length. Accordingly, the in-slot portion WAS2 and the in-slot portion WBS1 are overlapped in close contact with each other. The lengths of the first-conductor stepped portion WAD (WAD1, WAD2, ...) and the second-conductor stepped portion WBD (WBD1, WBD2, ...) will be explained later in detail.

As above, the in-slot portions S of the second conductor WB are overlapped in sequence on the outside of the in-slot portions S of the first conductor WA. The last in-slot portion WBS32 of the second conductor WB is singularly present. When the combined conductor W1 is wound (see FIG. 10), the number of overlapped portions of the connecting portions E is exactly half the number of overlapped portions of the in-slot portions S.

Figure 6:
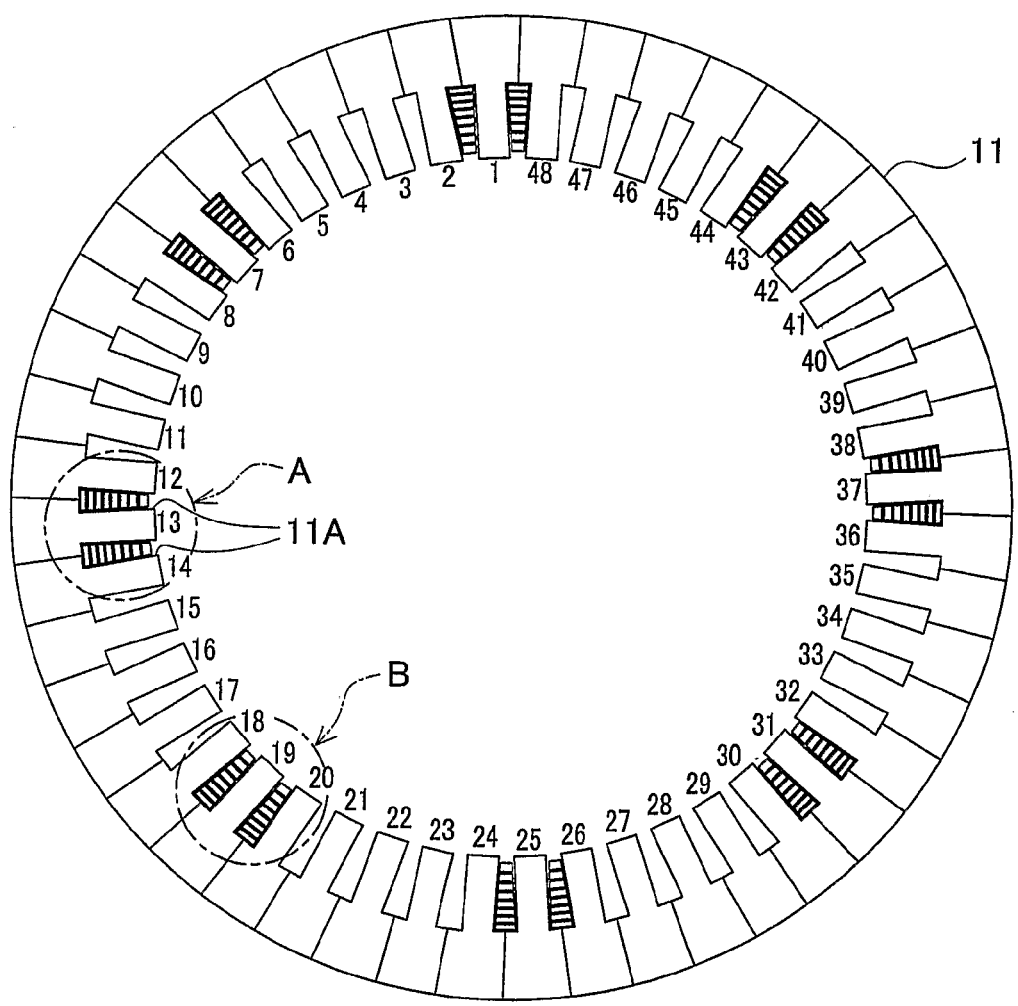
FIG. 6 is a view showing a state where only a W-phase coil is mounted in corresponding slots of forty-eight slots formed in a stator core.
Figure 7:
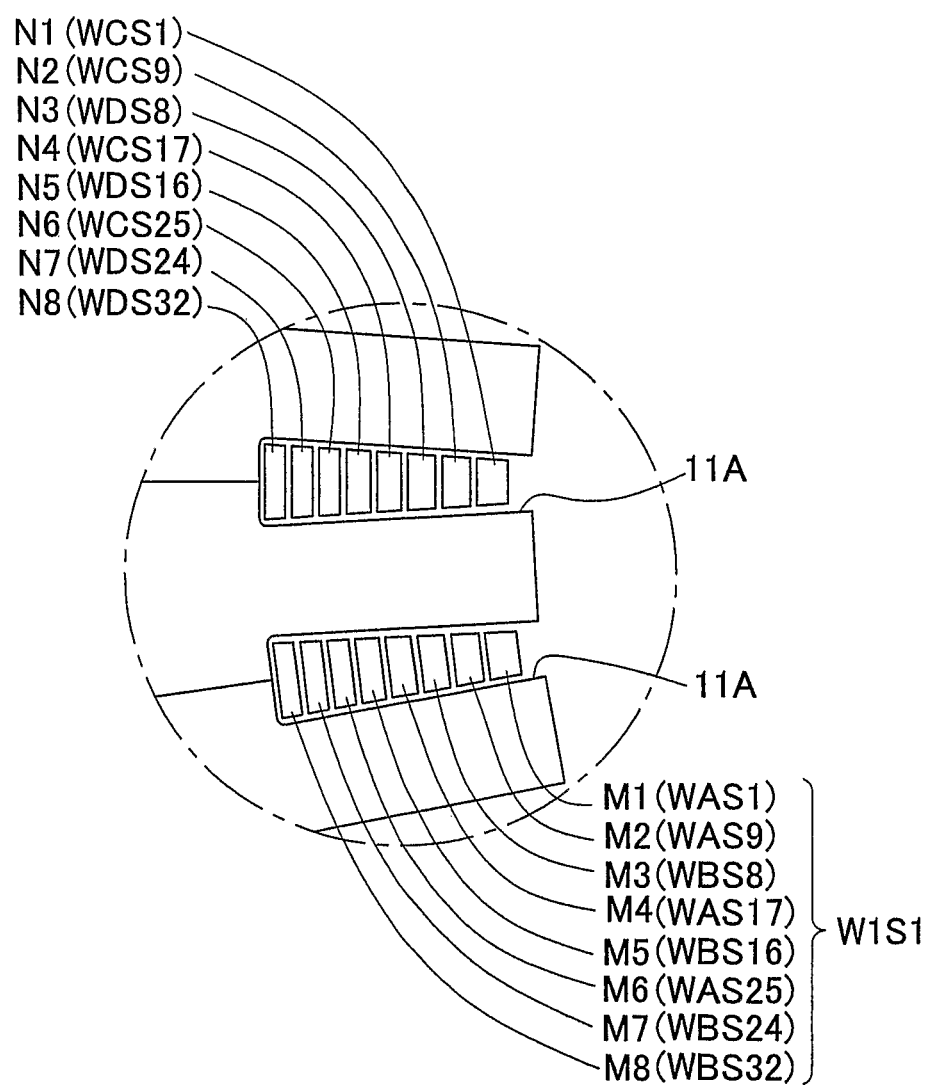
FIG. 7 is an enlarged view of a section A in FIG. 6.

On the other hand, FIG. 6 shows a state where only the coils of W phase are mounted in corresponding slots out of forty-eight slots 11A formed in a stator core 11. FIG. 7 is an enlarged view of a section A in FIG. 6.

In one slot 11A, eight in-slot portions M1 to M8 are set so that the in-slot portion M1 having a smallest width (in a circumferential direction of the core 11) and a largest thickness (in a radial direction of the core 11) is located in an innermost position in the radial direction of the stator core 11 and the in-slot portion M8 having a largest width (in the circumferential direction of the core 11) and a smallest thickness (in the radial direction of the core 11) is located in an outermost position in the radial direction of the core 11, and the other in-slot portions M2 to M7 are arranged so that their widths are wider and their thickness are smaller in sequence from the in-slot portion M1 side toward the in-slot portion M8 side. This arrangement is to reduce core loss, which may be caused if teeth parts are parallel to each other. The eight in-slot portions M (M1 to M8) have the same cross sectional area to provide the same electric resistance.

The in-slot portion M1 in FIG. 7 corresponds to the first in-slot portion S1 of the first conductor WA, namely, the in-slot portion WAS1.

The cross sectional shape of each in-slot portion S (S1 to S32) of the first conductor WA is explained below. The in-slot portions WAS1 to WAS8 in FIG. 4 are located in the innermost position (a first turn) and therefore have the same cross sectional shape as that of M1.

The cross sectional shape of an in-slot portion WAS9 corresponds to that of M2. The cross sectional shape of each of the in-slot portions WAS10 to WAS16 corresponds to that of M3. The cross sectional shape of the in-slot portion WAS17 is equal to that of M4. The cross sectional shape of each of the in-slot portions WAS18 to WAS24 corresponds to that of M5. The cross sectional shape of the in-slot portion WAS 25 corresponds to that of M6. Furthermore, the cross sectional shape of each of the in-slot portions WAS 26 to WAS 32 corresponds to that of M7.

Figure 8:
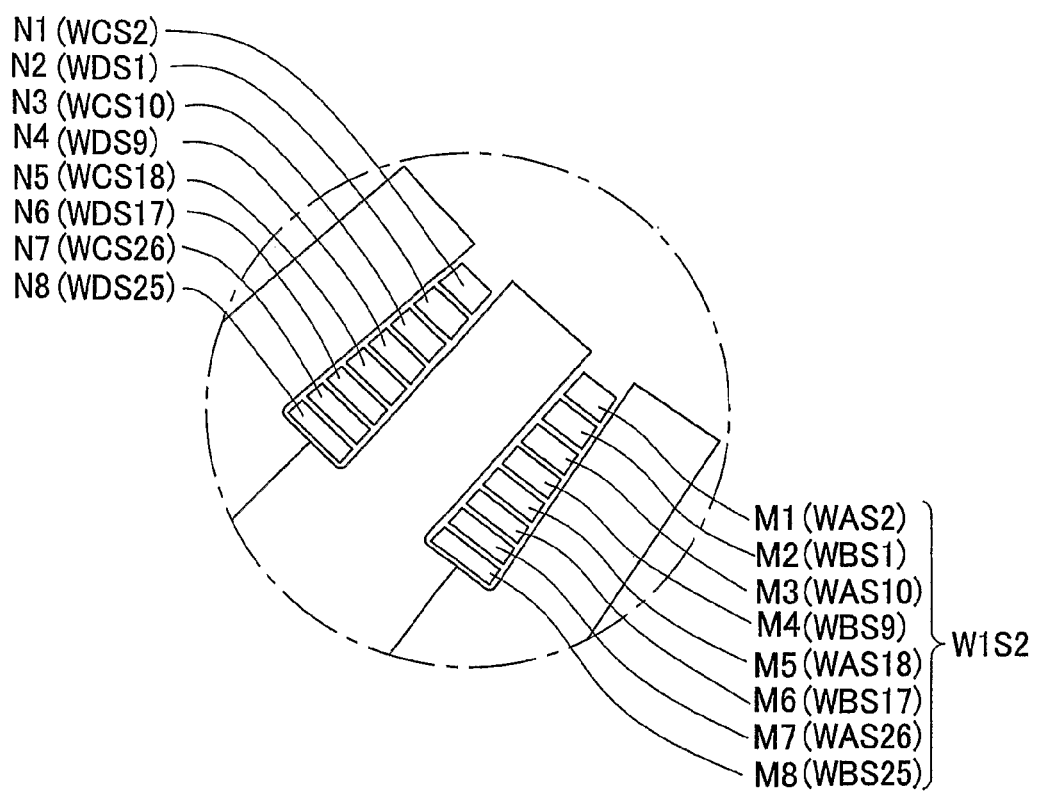
FIG. 8 is an enlarged view of a section B in FIG. 6.

The cross sectional shape of each in-slot portion S (S1 to S32) of the second conductor WB will be explained below. FIG. 8 is an enlarged view of a section B in FIG. 6. The in-slot portions WBS1 to WBS7 shown in FIG. 4 are located on a second turn and therefore have the same cross sectional shape as that of M2.

The cross sectional shape of the in-slot portion WBS8 corresponds to that of M3. The cross sectional shape of each of the in-slot portions WBS9 to WBS15 corresponds to that of M4. The cross sectional shape of the in-slot portion WBS16 corresponds to that of M5. The cross sectional shape of each of the in-slot portions WBS17 to WBS23 corresponds to that of M6. The cross sectional shape of the in-slot portion WBS24 corresponds to that of M7. The cross sectional shape of each of the in-slot portions WBS25 to WBS32 corresponds to that of M8.

As above, of eight sets of the conductors mounted in eight slots 11A, the in-slot portions S in each of seven sets have cross sectional shapes determined to be regularly different as shown in FIG. 8.

Figure 9:
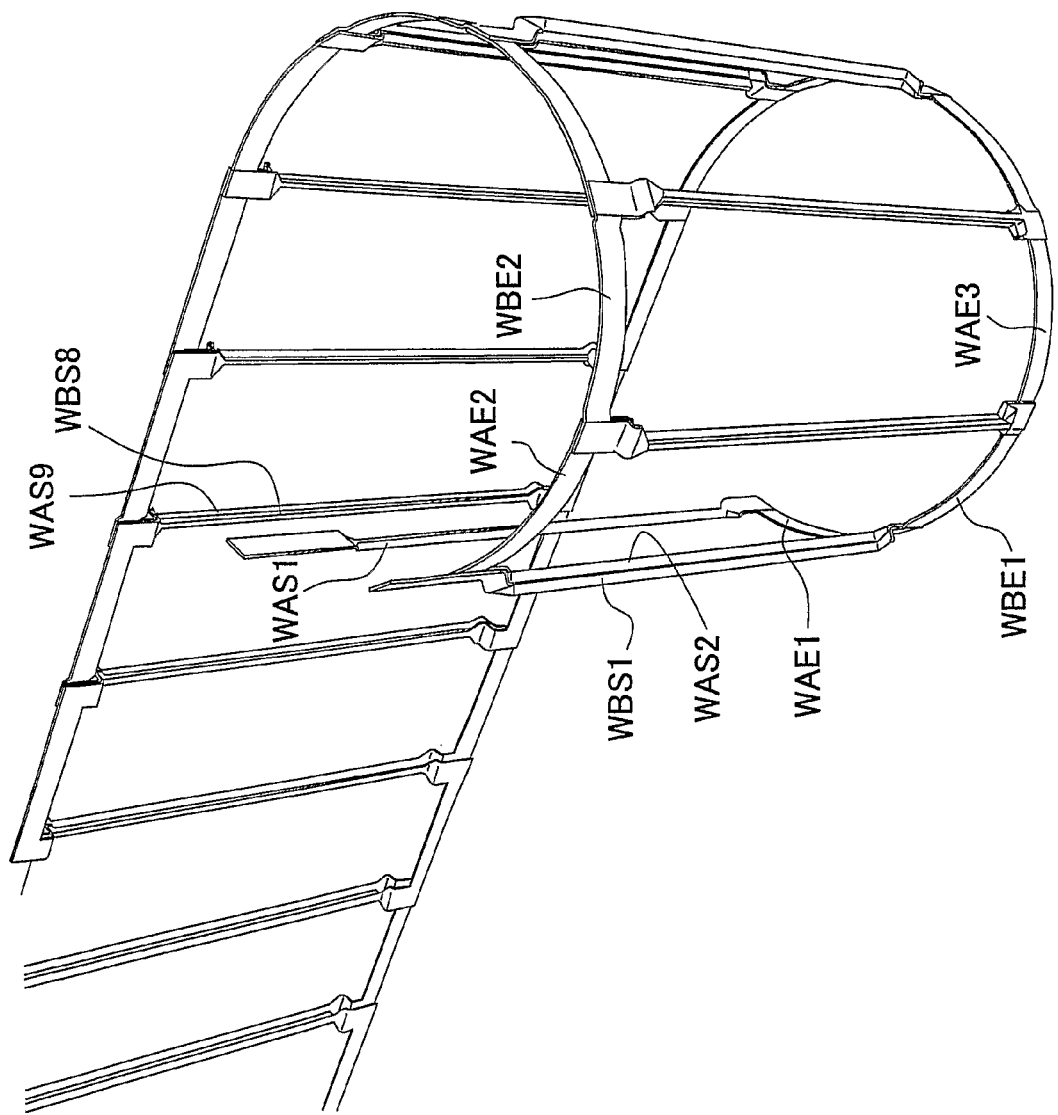
FIG. 9 is a view showing a state where a first combined conductor of W phase is wound by three fourths of one turn.

The following explanation is given to a step of winding the rectangular combined conductor W1 made of the first conductor WA and the second conductor WB overlapped one on the other to be offset by one pitch. FIG. 9 shows a state of a cage coil W1 wound by three fourths of one turn from the winding start.

The combined conductor W1 is wound so that the first conductor WA is placed on an inner peripheral side and the second conductor WB on an outer peripheral side. At the start time of winding, only the in-slot portion WAS1 of the first conductor WA is singularly present. Subsequently, the second to eighth in-slot portions S2 to S8 of the first conductor WA and the first to seventh in-slot portions S1 to S7 of the second conductor WB are overlapped respectively.

As shown in FIG. 7, when the combined conductor W1 is wound by one turn, a pair of the ninth in-slot portion WAS9 of the first conductor WA and the eighth in-slot portion WBS8 of the second conductor WB are overlapped on the outside of the in-slot portion WAS1 which is a first single wire of the first conductor WA. Herein, the first in-slot portion WAS1 and the ninth in-slot portion WAS9 of the first conductor WA are directly laminated one on the other.

As shown in FIG. 8, a pair of the tenth in-slot portion WAS10 of the first conductor WA and the ninth in-slot portion WBS9 of the second conductor WB in overlapping relation is wound around the outside of the pair of the second in-slot portion WAS2 of the first conductor WA and the first in-slot portion WBS1 of the second conductor WB. In this state, the first conductor WA and the second conductor WB are alternately located.

As shown in FIG. 9, the connecting portion WAE2 having a thin plate shape in the first conductor WA and the connecting portion WBE1 having a thin plate shape in the second conductor WB constitute an upper side and a lower side of one rectangle respectively.

Figure 10:
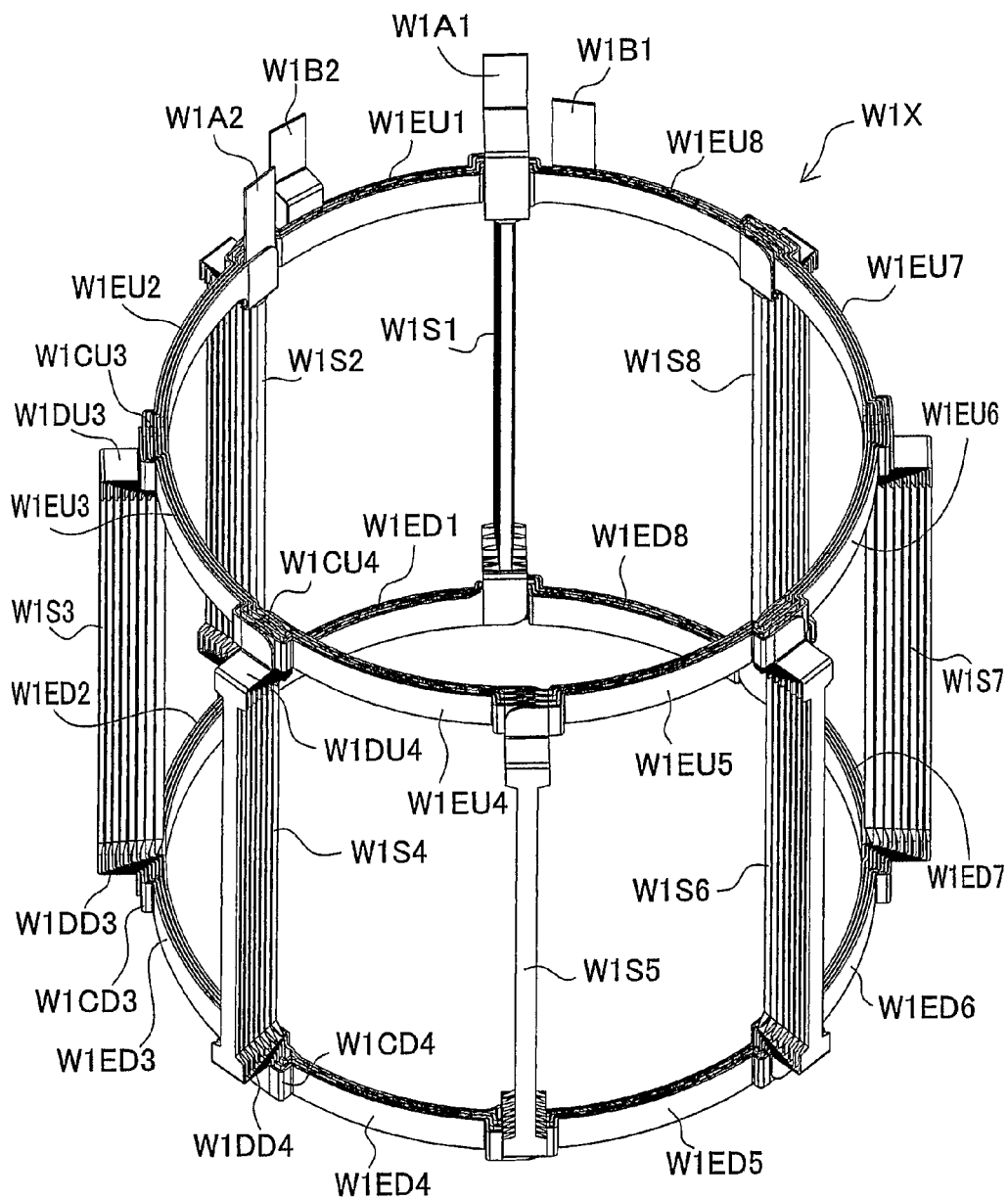
FIG. 10 is a view showing a state where the W-phase first combined conductor is wound by four turns.

FIG. 10 shows a state where the first combined conductor W1 wound by four turns (corresponding to a cage coil W1X). In this state, a first combined-conductor in-slot portion W1S1, a second combined-conductor in-slot portion W1S2, . . . , an eighth combined-conductor in-slot portion W1S8 are formed.

The first combined-conductor in-slot portion W1S1 includes eight conductor in-slot portions S as shown in FIG. 7. The second combined-conductor in-slot portion W1S2 includes eight conductor in-slot portions S as shown in FIG. 8.

Furthermore, a first upper connecting portion W1EU1 to an eighth upper connecting portion W1EU8 are formed. A first lower connecting portion W1ED1 to an eighth lower connecting portion W1ED8 are formed.

Each of the upper connecting portion W1EU and the lower connecting portion W1ED is constituted of four thin-plate-shaped connecting portions including two first connecting portions WAE and two second connecting portions WBE in laminated relation. Herein, the thin-plate-shaped connecting portions are formed as a protrusion W1CU (W1CU1 to W1CU8) just above each in-slot portion. The thin-plate-shaped connecting portions is formed as a protrusion W1CD (W1CD1 to W1CD8) just below each in-slot portion. This is to adjust positional displacement between the connecting portions and the in-slot portions. As mentioned later, the protrusions W1CU, the protrusions W1CD, stepped portions W1DU, and stepped portions W1DD adjust in combination the displacement between the connecting portions and the in-slot portions.

As shown in FIG. 10, each upper stepped portion W1DU (W1DU1 to W1DU8; W1DU3 and W1DU4 of which are marked in the figure) connects each combined-conductor in-slot portion W1S (W1S1 to W1S8) to each corresponding upper connecting portion W1EU (W1EU1 to W1EU8). Each upper stepped portion W1DU includes stepped portions having different lengths in order to connect each in-slot portion W1S and each upper connecting portion W1EU. Specifically, eight in-slot portions S constituting each in-slot portion W1S are of different thicknesses and four connecting portions E constituting each upper connecting portions W1EU are connected to next but one of eight in-slot portions S. In addition, the connecting portions E are formed in thin plate shape and laminated in close relation. Accordingly, the lengths of the stepped portions constituting each upper stepped portion W1DU are determined to be different from each other to meet respective conditions.

Similarly, each lower stepped portion W1DD (W1DD1 to W1DD8; only W1DD3 and W1DD4 of which are marked in the figure) connects each combined-conductor in-slot portion W1S to each corresponding lower connecting portion W1ED (W1ED1 to W1ED8). Each lower stepped portion W1DD includes stepped portions having different lengths in order to connect each combined-conductor in-slot portion W1S (W1S1 to W1S8) and each lower connecting portion WJED.

Furthermore, each upper stepped portion W1DU includes a protrusion W1CU (only W1CU3 and W1CU4 are marked in FIG. 10) radially outwardly protruding from the upper connecting portion W1EU. Each protrusion W1CU is constituted of total eight connecting portions, i.e., four connecting portions WAE of the first conductor WA and four connecting portions WBE of the second conductor WB. Thus, each protrusion W1CU is thicker than each upper connecting portion W1EU.

Similarly, each lower stepped portion W1DD includes a protrusion W1CD (only W1CU3 and W1CU4 are marked in FIG. 10) radially outwardly protruding from the lower connecting portion W1ED.

As shown in FIG. 10, in the cage coil W1X of the combined conductor W1, four terminals W1A1, W1B1, W1A2, and W1B2 are placed protruding upward. Furthermore, the shape of each conductor in-slot portion is as shown in FIG. 6. FIG. 6 shows a state where the cage coil W1X and another cage coil W2X mentioned later are mounted in sixteen slots of total forty-eight slots 11.

Figure 3:
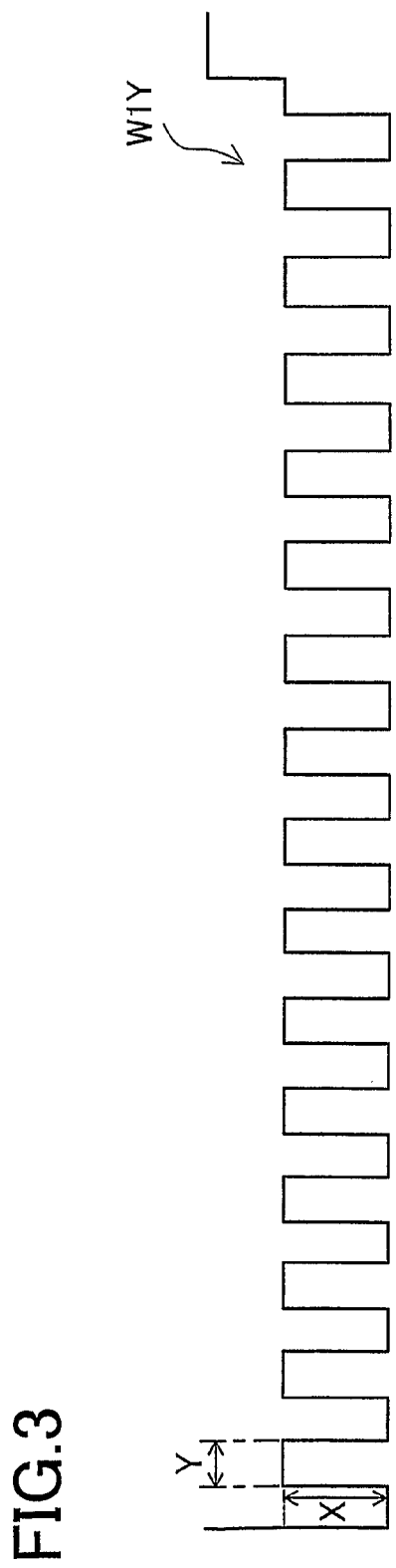
FIG. 3 is a view showing a shape of a material copper wire which is a row material.

Next, a manufacturing method of the first conductor WA is explained. FIG. 3 shows the shape of a material copper wire W1Y which is a raw material. The copper wire W1Y used herein is made from a copper wire having a circular cross section or a copper wire having a flat rectangular cross section. The copper wire W1Y is formed in a zig-zag pattern as shown in FIG. 3. At this time, taking into consideration differences in length of stepped portions, each length X in a lateral direction of the zig-zag pattern and each length Y in a longitudinal direction of the zig-zag pattern are determined respectively. The lengths Y are determined to be longer in sequence from one end of the copper wire W1Y to the other end but not clearly illustrated in the figure. This design of the gradually longer lengths Y is to correspond to the gradually increasing diameter of the combined conductor W1 when it is wound. The lengths X are determined to be different according to the lengths of the upper stepped portion W1DU and the lower stepped portion W1DD.

Such copper wire W1Y is formed into the first conductor W1 shown in FIG. 1 by use of a press die. A second conductor W2 and others are similarly produced. Herein, the shape of the combined-conductor in-slot portion W1S and the shape of the thin-plate-shaped connecting portion are simultaneously formed by a press die. After the pressing, the copper wire W1Y is coated with enamel by electrodeposition coating.

Figure 11:
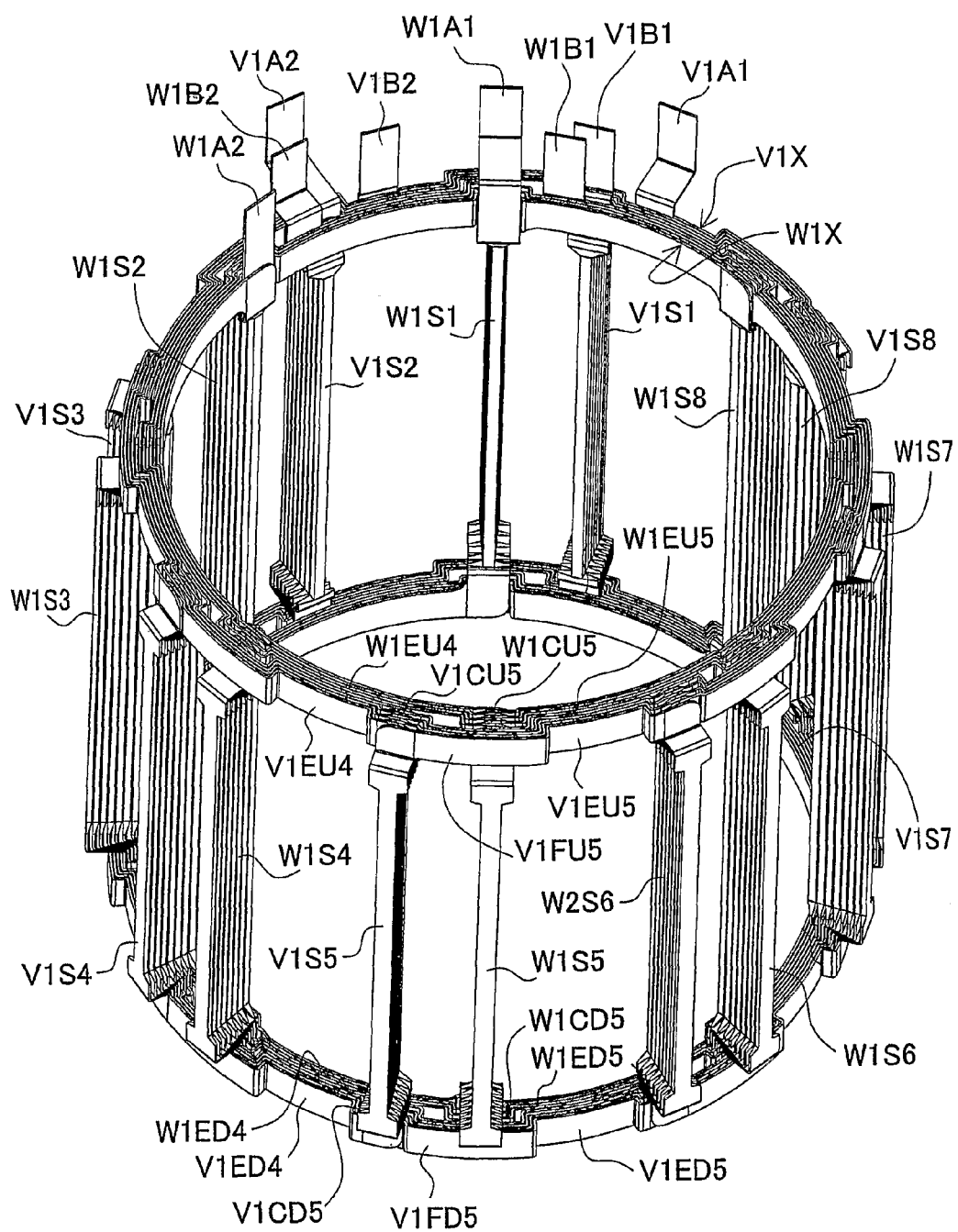
FIG. 11 is a view showing a state where a first combined conductor of V phase is wound around the W-phase first combined conductor completely wound as shown in FIG. 10.

FIG. 11 shows a state where a first combined conductor V1 of V phase is wound around the W-phase first combined conductor W1 completely wound as shown in FIG. 10. This is a state where the cage coil constituted of the first combined conductor V1 is placed to surround the outer periphery of the cage coil of W1.

The first combined conductor W1 is a first combined conductor of W phase and the first combined conductor V1 is a first combined conductor of V phase. The first combined conductor V1 is formed in a rectangular shape as with the first combined conductor W1 by placing a first conductor VA of a continuous zig-zag pattern and a second conductor VB of a continuous zig-zag pattern in overlapping relation but with a displacement of one pitch from each other by one pitch.

A protrusion V1CU (V1CU1 to V1CU8, out of which V1CU5 is marked in FIG. 11) of an upper connecting portion V1EU (V1EU1 to V1EU8, out of which V1EU4 and V1EU5 are marked in the figure) of the first combined conductor V1 is formed outside the upper connecting portion W1EU of the W-phase first combined conductor W1. The protrusion W1CU5 of the first combined conductor W1 is placed on the right of the protrusion V1CU5 in FIG. 11. Accordingly, the first combined conductor V1 includes a recess V1FU5 (out of recesses V1FU1 to V1FU8, only the recess V1FU5 is marked in the figure) continuous to the protrusion V1CU5 to bypass the W1 (W1CU5). In other portions of the first combined conductor V1, the thin-plate-shaped connecting portions of the first conductor W1 and those of the first conductor V1 are placed in close contact relation to reduce the outer diameter of this assembly.

On the right of a protrusion V1CD5 of the lower connecting portion VIED, the protrusion W1CD5 of the first combined conductor W1 is placed. Accordingly, the first combined conductor V1 includes a recess V1FD5 (out of recesses V1FD1 to V1FD8, only the recess V1FD5 is marked in the figure) continuous to the protrusion V1CD5 to bypass the W1 (W1CD5). In other portions of the first combined conductor V1, the thin-plate-shaped connecting portions of the first conductor W1 and those of the first combined conductor V1 are placed in close contact relation to reduce the outer diameter of this assembly.

Figure 12:
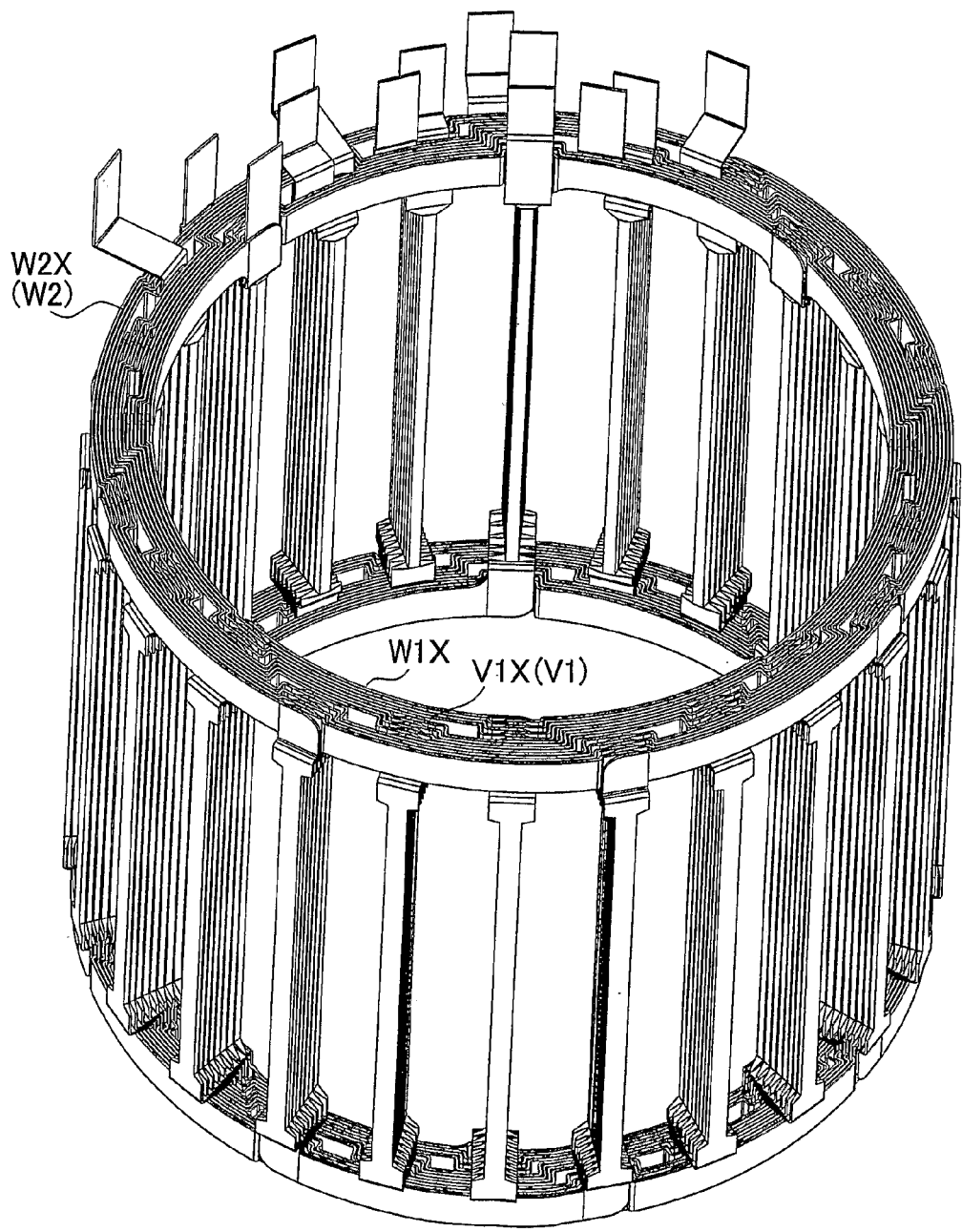
FIG. 12 is a view showing a state where a second combined conductor of W phase is wound around a cage-shaped coil (hereinafter, "cage coil") of FIG. 11.

FIG. 12 shows a state where the second combined conductor W2 of W phase is wound around the cage coils of FIG. 11. To be concrete, a cage coil V1X constituted of the V-phase combined conductor V1 is formed around the cage coil W1X constituted of the W-phase first combined conductor W1. Furthermore, a cage coil W2X of the W-phase second combined conductor W2 is formed to surround the cage coil V1X.

Figure 13:
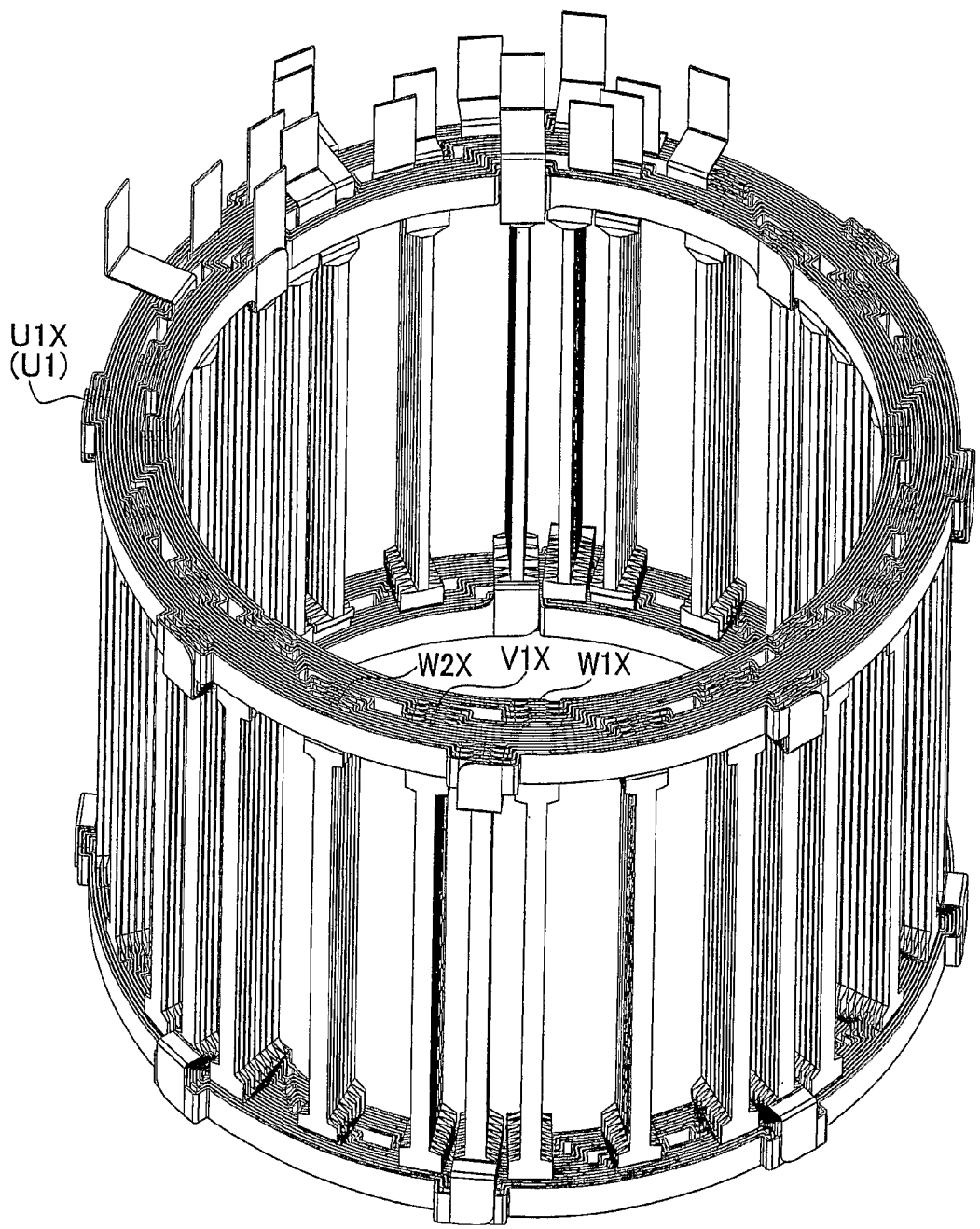
FIG. 13 is a view showing a state where a first combined conductor of U phase is wound around a cage coil of FIG. 12.

FIG. 13 shows a state where a first combined conductor U1 of U phase is wound around the cage coils of FIG. 12. Concretely, the cage coil V1X of the V-phase first combined conductor V1 is formed around the cage coil W1X of the W-phase first combined conductor W1, the cage coil W2X of the W-phase first combined conductor W2 is formed around the cage coil V1X, and furthermore a cage coil U1X of the U-phase first combined conductor U1 is formed to surround the cage coil W2X.

Figure 14:
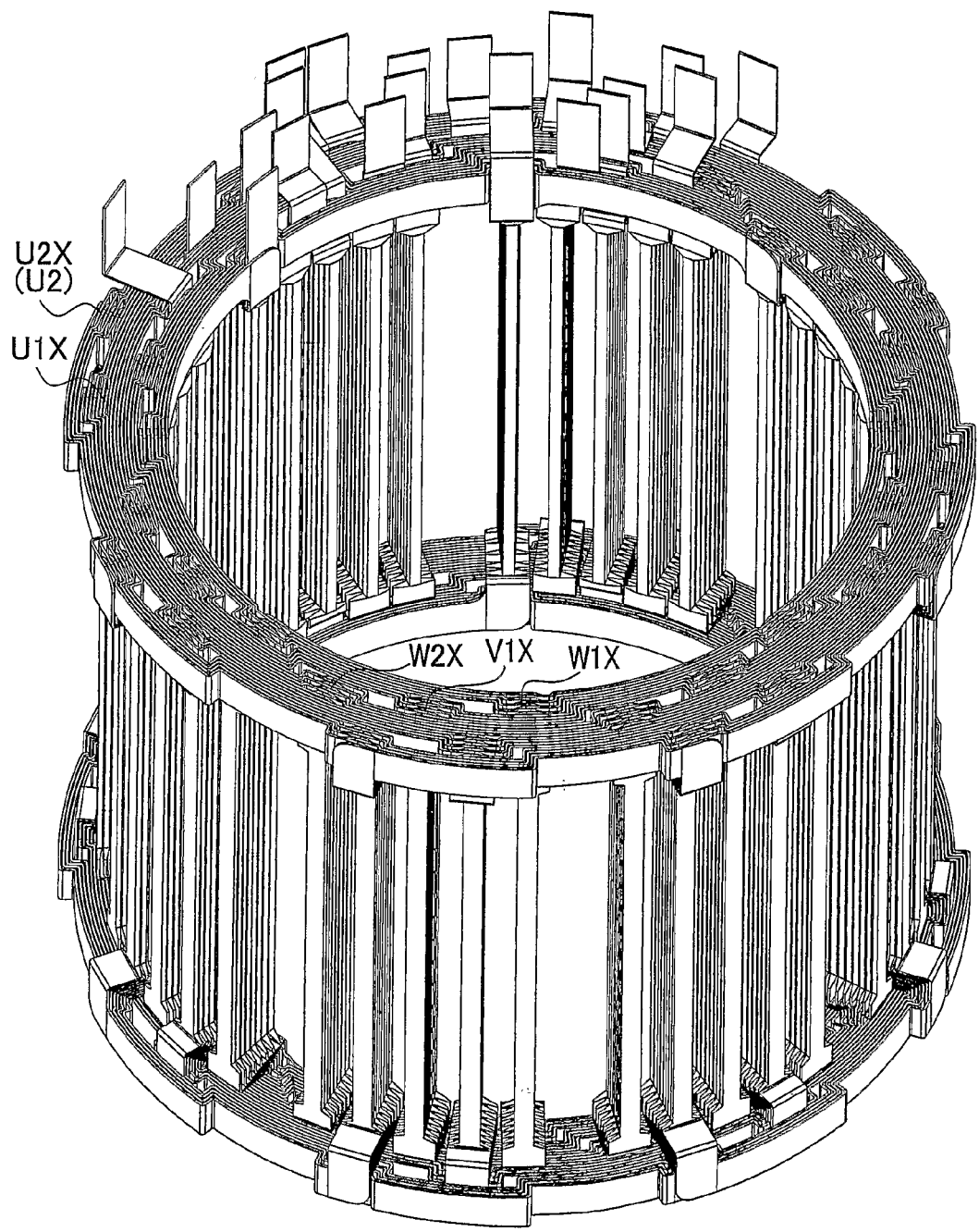
FIG. 14 is a view showing a state where a second combined conductor of U phase is wound around a cage coil of FIG. 13.

FIG. 14 shows a state where a second combined conductor U2 of U phase is wound around the cage coils of FIG. 13. Specifically speaking, the cage coil V1X of the V-phase first combined conductor V1 is formed around the cage coil W1X of the W-phase first combined conductor W1, the cage coil W2X of the W-phase second combined conductor W2 is formed around the cage coil V1X, the cage coil U1X of the U-phase first combined conductor U1 is formed around the cage coil W2X, and further a cage coil U2X of the U-phase second combined conductor U2 is formed to surround the cage coil U1X.

Figure 15:
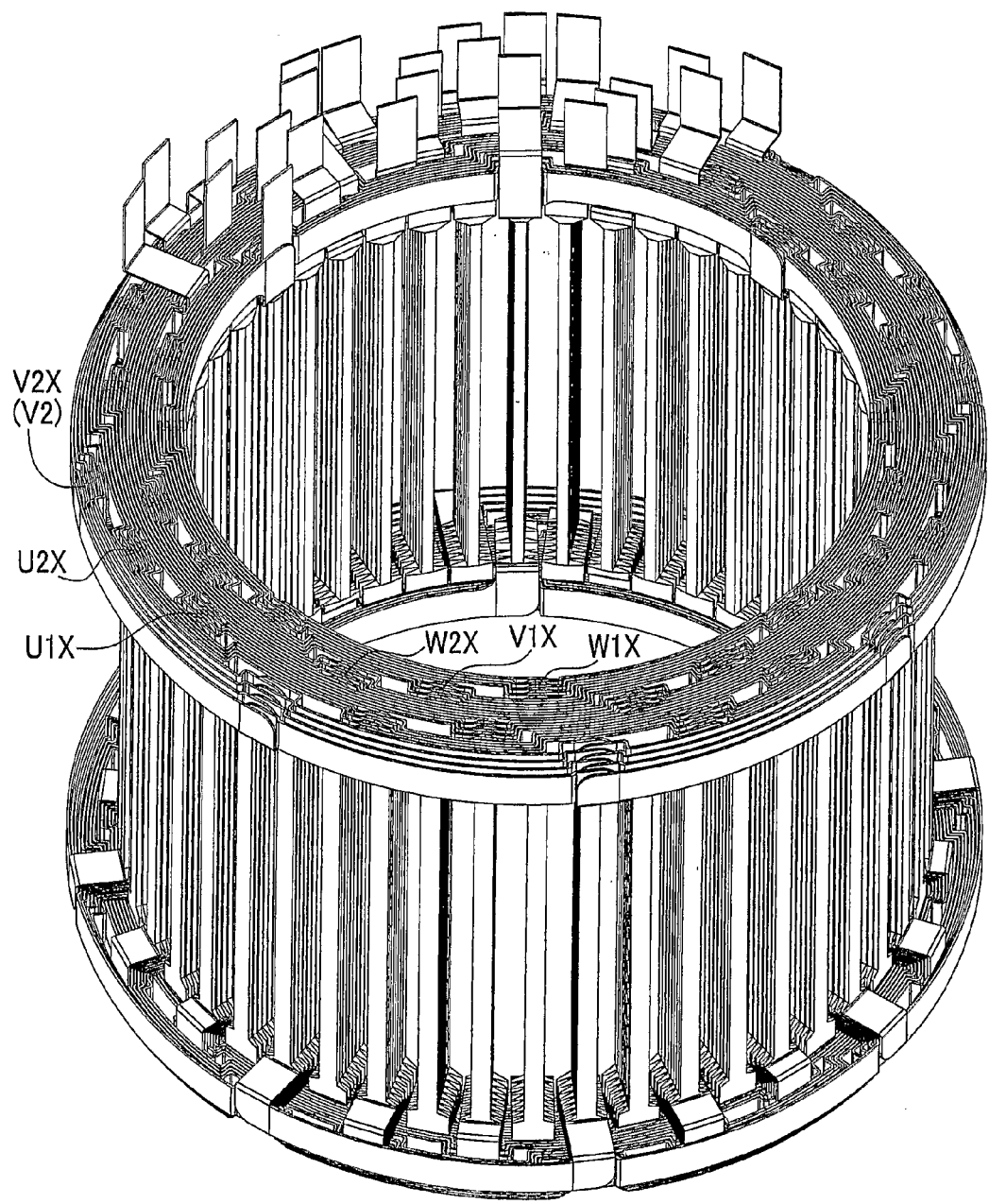
FIG. 15 is a view showing a state where a second combined conductor of V phase is wound around a cage coil of FIG. 14.

FIG. 15 shows a state where a second combined conductor V2 of V phase is wound around the cage coil of FIG. 14. Concretely, the cage coil V1X of V1 is formed around the cage coil W1X of the W-phase first combined conductor W1, the cage coil W2X of the W-phase second combined conductor W2 is formed around the cage coil V1X, the cage coil U1X of the U-phase first combined conductor U1 is formed around the cage coil W2X, the cage coil U2X of the U-phase second combined conductor U2 is formed around the cage coil U1X, and further a cage coil V2X of the V-phase second combined conductor V2 is formed to surround the cage coil U2X.

Figure 16:
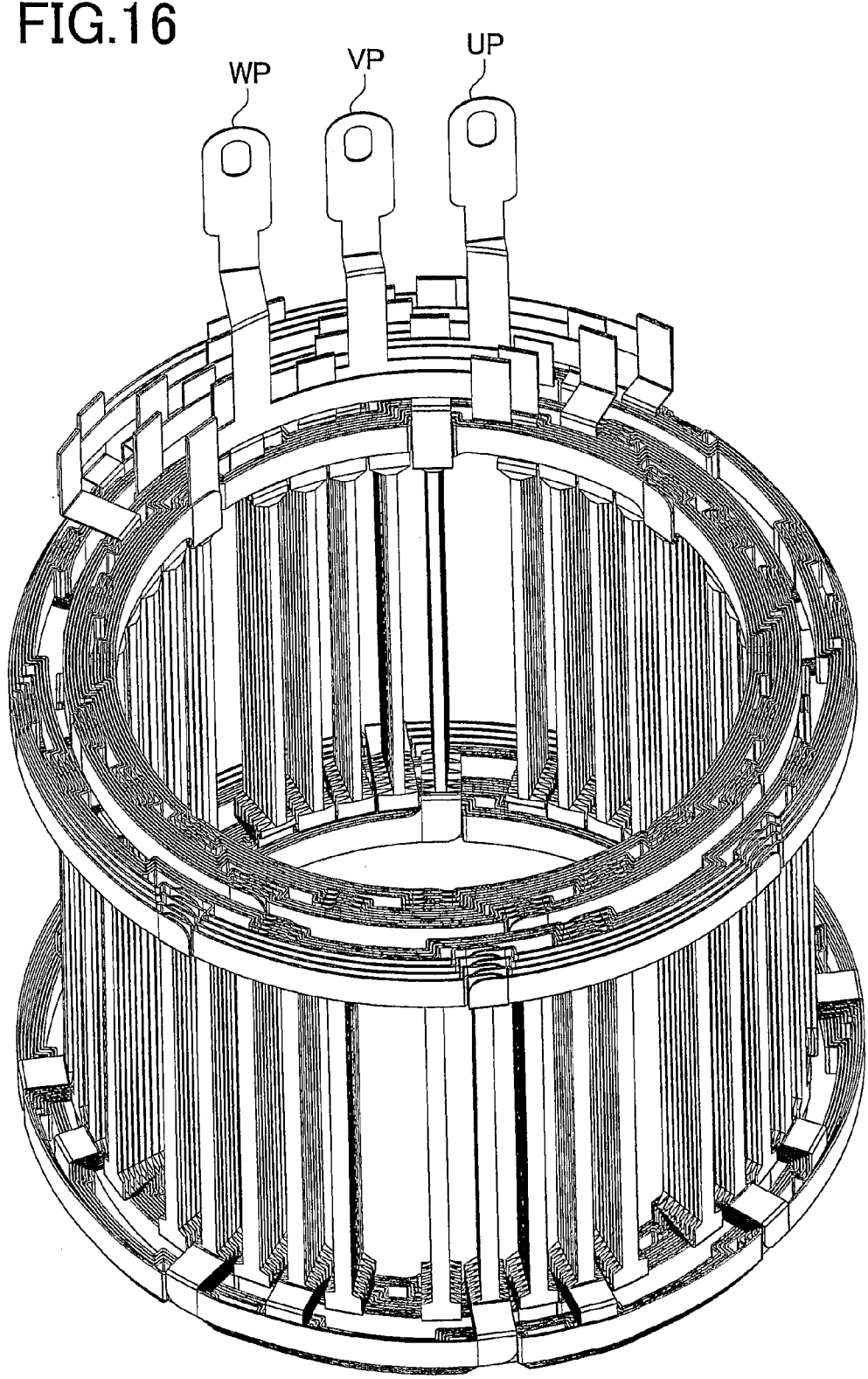
FIG. 16 is a view showing a state where a W-phase terminal, a V-phase terminal, and a U-phase terminal are connected to a cage coil of FIG. 15 and thus showing a finished coil.

FIG. 16 shows a finished coil in which a W phase terminal WP, a V phase terminal VP, and a U phase terminal UP are connected to the assembly of FIG. 15.

A manufacturing method of a stator core is explained below. As shown in a step (1) in FIG. 18, forty-eight teeth parts T (T1, T2, . . . ) are mounted from inside between the forty-eight in-slot portions S. Each teeth part T is a component made of laminated steel plates. At that time, an insulator not shown is mounted between each in-slot portion S and each teeth part T to insulate them from each other.

Figure 17:
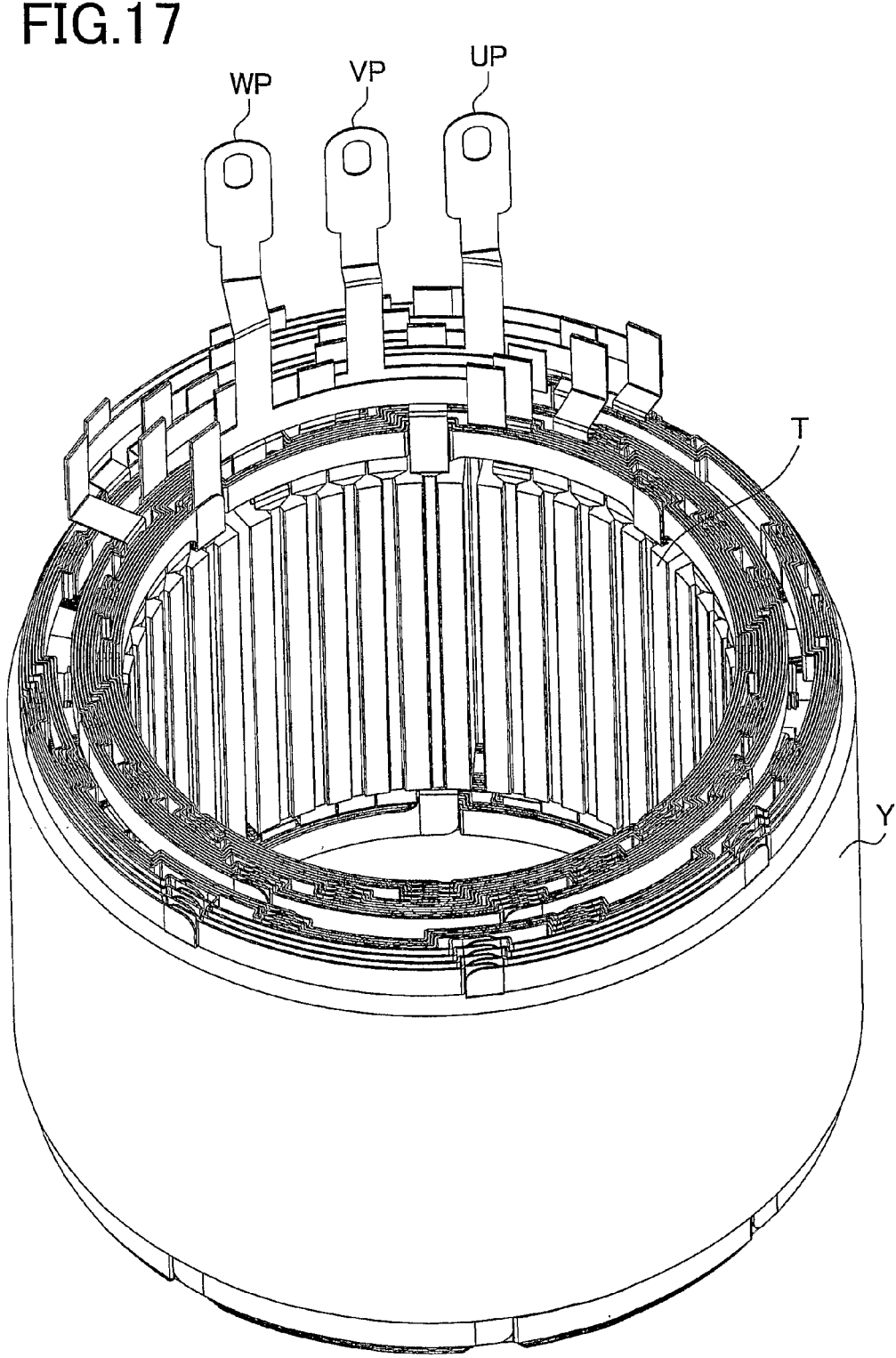
FIG. 17 is a view showing a step of mounting teeth parts and a back yoke to a cage coil of FIG. 16.

A flange TT is formed in the rear end of each teeth part T (the inner peripheral side of the coil). Each flange TT comes into contact with the in-slot portions S to position each teeth part T in an insertion direction. After that, forty-eight back yokes Y (Y1, Y2, . . . ) are press-fitted individually between the teeth parts T in sequence from the outer peripheral side as shown in steps (2) and (3) in FIG. 18. At that time, the inner periphery of the teeth parts T is positioned in place by a positioning guide not shown. In this way, a stator is completed as shown in FIG. 17. In FIG. 17, a shrink fit ring and division lines of the stator core are omitted.

As the details are explained above, the stator and the coil of the present embodiment have the following configurations. The first conductor WA and the second conductor WB, each being formed in a continuous zig-zag pattern, are combined with a displacement of one pitch from each other to constitute the rectangular combined conductor W1. A plurality of the combined conductors W1 are wound in sequence to form the cage coils. Each combined conductor W1 includes (a) the conductor in-slot portions WAS and WBS including overlapped in each slot of the stator core, (b) the connecting portions WAE and WBE circumferentially placed on the outside of the slots, and (c) the conductor stepped portions WAD and WBD that connect the conductor in-slot portions to the connecting portions respectively. Each of the connecting portions is formed in a thin plate shape by pressing. Accordingly, the first conductor WA and the second conductor WB have only to be simply placed in overlapping relation with a displacement without needing braiding, thus enhancing the production efficiency.

Herein, if the conductors WA and WB are simply overlapped one on the other, each of the upper and lower connecting portions W1EU and W1ED may have increased thickness in the diametrical direction. However, in the present embodiment, the connecting portions WAE and WBE constituting the upper and lower connecting portions W1EU and W1ED are formed in thin plate shape by pressing and therefore overlapping of such thin-plate-shaped connecting portions can reduce the thickness of the upper and lower connecting portions W1EU and W1ED in the diametrical direction. This can reduce the length of the coil end in the diametrical direction and achieve an entirely compact motor.

Furthermore, the connecting portions WAE and WBE each having a thin plate shape may cause displacement between the connecting portions WAE and WBE and the conductor in-slot portions WAS and WBS. In the present embodiment, however, the conductor stepped portions WAD and WBD having different lengths can place the upper and lower connecting portions W1EU and W1ED in any positions even if the displacement occurs.

In the stator and the coil of the present embodiment, the conductor in-slot portions have different thicknesses and widths and are placed in each slot in overlapping relation so that the thicknesses are smaller and the widths are larger in sequence from the inner peripheral side toward the outer peripheral side. The lengths of the conductor stepped portions WAD and WBD are different according to the positions of the in-slot portions and the different thicknesses. When the positions of the in-slot portions are different from the positions of the connecting portions, such difference can be adjusted by the stepped portions having different lengths. Accordingly, it is possible to freely design the positions of the conductor in-slot portions and the positions of the connecting portions.

In the stator and the coil of the present embodiment, the cage coils include the first-phase cage coil (the cage coil W1X formed of the W-phase combined conductor W1), the second-phase cage coil (the cage coil V1X formed of the V-phase combined conductor V1), and the third-phase cage coil (the cage coil U1X formed of the U-phase combined conductor U1) that are wound on one another for applying W-phase, V-phase, and U-phase currents respectively. The first-phase cage coil (the cage coil W1X) includes the protrusion in each of the connecting portions arranged in both ends in the axial direction of the stator. The second-phase cage coil (the cage coil V1X) includes the recess V1F (V1FU, V1FD) in each of the connecting portions V1E (V1EU, V1ED) to bypass the protrusion formed in each of the connecting portions W1E (W1EU, W1ED) of the first-phase cage coil. Accordingly, since the thin-plate-shaped connecting portions V1E include the recesses V1F, each recess V1F allows bypassing of a joining portion between each combined-conductor in-slot portion W1S and each connecting portion W1E even if it becomes wider. This can reduce the entire length of the connecting portions in the diametrical direction, resulting in a reduced length of the coil ends in the diametrical direction, thus achieving an entirely compact motor.

The present invention is not limited to the aforementioned embodiments and may be embodied in other specific forms without departing from the essential characteristics thereof.

For instance, the above embodiment omits the explanation of a step of molding the stator assembly. The stator assembly may be molded with resin to finish a stator.

In the above embodiment, each of the W phase, the V phase, and the U phase are provided by two coil assemblies but may be constituted by one cage coil per phase or by three or more coil cages.

In the above embodiment, the lengths of the stepped portions are determined to be different in accordance with the positions of the in-slot portions and the different thicknesses of the conductor in-slot portions. If the thicknesses of the conductor in-slot portions are equal, the lengths of the stepped portions may be determined to be different in accordance with the positions of the in-slot portions in the slot.

In the above embodiment, each thin-plate-shaped connecting portion is formed by pressing but may be formed by another plastic deformation technique or by casting.

While the presently preferred embodiment of the present invention has been shown and described, it is to be understood that this disclosure is for the purpose of illustration and that various changes and modifications may be made without departing from the scope of the invention as set forth in the appended claims.

REFERENCE SIGNS LIST

WA First conductor
WB Second conductor
W1, W2 W-phase combined conductor
V1, V2 V-phase combined conductor
U1, U2 U-phase combined conductor
WAS, WBS Conductor in-slot portion
W1S Combined-conductor in-slot portion
W1EU Upper connecting portion
W1ED Lower connecting portion
WAD, WBD Conductor stepped portion
W1DU, W1DD Stepped portion
W1X, W2X W-phase cage coil
V1X, V2X V-phase cage coil
U1X, U2X U-phase cage coil
V1CU, V1CD Protrusion
V1FU, V1FD Recess
T Teeth
Y Back yoke

The invention claimed is:

1. A stator comprising:
a stator core having a plurality of slots; and
a cage coil formed of a rectangular combined conductor that is wound by a plurality of turns, the combined conductor including:
a first conductor formed in a continuous zig-zag pattern;
a second conductor formed in a continuous zig-zag pattern, the first and second conductors being combined to overlap one on the other with a displacement of one pitch;
conductor in-slot portions overlapped and mounted in each of the slots of the stator core;
conductor connecting portions placed circumferentially on the outside of the slots; and
conductor stepped portions connecting the conductor in-slot portions and the conductor connecting portions,
wherein the first conductor and the second conductor are separately provided, and
wherein the cage coil includes a first-phase cage coil, a second-phase cage coil, and a third-phase cage coil that are wound on one another for applying W-phase current, V-phase current, and U-phase current respectively, and
the first-phase cage coil includes a radially outward protrusion in each of the connecting portions arranged in both ends in an axial direction of the stator, the protrusions being located at both ends of each conductor in-slot portion in the axial direction, and
the second-phase cage coil includes a radially outward protrusion in each of the connecting portions arranged in both ends in the axial direction of the stator, the protrusions being located at both ends of each conductor in-slot portion in the axial direction, and further includes a recess extending continuous to each protrusion and further radially outward to bypass the protrusions formed in each of the connecting portions of the first-phase cage coil.

2. The stator according to claim 1, wherein
each conductor connecting portion has a thin plate shape.

3. The stator according to claim 1, wherein
the stepped portions have different lengths according to the positions of the conductor in-slot portions.

4. The stator according to claim 1, wherein
the conductor in-slot portions have different thicknesses and widths so that the thicknesses are smaller and the widths are wider in sequence from an inner peripheral side toward an outer peripheral side of the stator core when the conductor in-slot portions are mounted in the slots.

5. The stator according to claim 1, wherein
the connecting portions of the second-phase cage coil are placed in close contact with the connecting portions of the first-phase cage coil in a diametrical direction of the stator, excepting the recesses.

6. A coil to be mounted in a stator core having a plurality of slots, the coil comprising:
a cage coil formed of a rectangular combined conductor that is wound by a plurality of turns, the combined conductor including:
a first conductor formed in a continuous zig-zag pattern;
a second conductor formed in a continuous zig-zag pattern, the first and second conductors being combined to overlap one on the other with a displacement of one pitch,
conductor in-slot portions to be overlapped and mounted in each of the slots of the stator core;
conductor connecting portions to be placed circumferentially on the outside of the slots; and
conductor stepped portions connecting the conductor in-slot portions and the conductor connecting portions,
wherein the first conductor and the second conductor are separately provided, and
wherein the cage coil includes a first-phase cage coil, a second-phase cage coil, and a third-phase cage coil that are wound on one another for applying W-phase current, V-phase current, and U-phase current respectively, and the first-phase cage coil includes a radially outward protrusion in each of the connecting portions arranged in both ends in an axial direction of the stator, the protrusions being located at both ends of each conductor in-slot portion in the axial direction, and the second-phase cage coil includes a radially outward protrusion in each of the conductor connecting portions arranged in both ends in the axial direction of the stator, the protrusions being located at both ends of each conductor in-slot portion in the axial direction, and further includes a recess extending continuous to each protrusion and further radially outward to bypass the protrusions formed in each of the connecting portions of the first-phase cage coil.

7. The coil according to claim 6, wherein
each conductor connecting portion has a thin plate shape.

8. The coil according to claim 6, wherein
the stepped portions have different lengths according to the positions of the conductor in-slot portions.

9. The coil according to claim 6, wherein
the conductor in-slot portions have different thicknesses and widths so that the thicknesses are smaller and the widths are wider in sequence from an inner peripheral side toward an outer peripheral side of the stator core when the conductor in-slot portions are mounted in the slots.

10. The coil according to claim 6, wherein
the connecting portions of the second-phase cage coil are placed in close contact with the connecting portions of the first-phase cage coil in a diametrical direction of the stator, excepting the recesses.

* * * * *